US 12,043,101 B2

(12) United States Patent
Maruyama et al.

(10) Patent No.: US 12,043,101 B2
(45) Date of Patent: Jul. 23, 2024

(54) POWER SUPPLY DEVICE

(71) Applicant: Yazaki Corporation, Tokyo (JP)

(72) Inventors: Akinori Maruyama, Susono (JP); Kentaro Imoto, Susono (JP)

(73) Assignee: YAZAKI CORPORATION, Tokyo (JP)

(*) Notice: Subject to any disclaimer, the term of this patent is extended or adjusted under 35 U.S.C. 154(b) by 584 days.

(21) Appl. No.: 17/375,201

(22) Filed: Jul. 14, 2021

(65) Prior Publication Data
US 2022/0055468 A1 Feb. 24, 2022

(30) Foreign Application Priority Data
Aug. 19, 2020 (JP) ................. 2020-138729

(51) Int. Cl.
*B60K 1/04* (2019.01)
*B60L 50/00* (2019.01)
*B60L 50/60* (2019.01)
*B60L 53/80* (2019.01)
*H01M 50/20* (2021.01)
*H02J 7/00* (2006.01)

(52) U.S. Cl.
CPC .............. *B60K 1/04* (2013.01); *B60L 50/66* (2019.02); *B60L 53/80* (2019.02); *H01M 50/20* (2021.01); *H02J 7/00* (2013.01)

(58) Field of Classification Search
CPC . H02J 7/00; H01M 50/20; B60L 50/66; B60L 53/80; B60K 1/04
USPC .................................. 320/110, 109, 113, 115
See application file for complete search history.

(56) References Cited

U.S. PATENT DOCUMENTS

| | | | |
|---|---|---|---|
| 10,097,035 B2* | 10/2018 | Harada | H02J 7/02 |
| 11,056,889 B2* | 7/2021 | Binder | H02J 3/38 |
| 2003/0001437 A1 | 1/2003 | Testin et al. | |
| 2010/0123989 A1 | 5/2010 | Kosaki et al. | |
| 2010/0219794 A1* | 9/2010 | Sugimoto | H02J 7/0024 320/128 |
| 2011/0087395 A1 | 4/2011 | Yamamoto et al. | |
| 2011/0133558 A1* | 6/2011 | Park | H02J 3/32 307/66 |

(Continued)

FOREIGN PATENT DOCUMENTS

| | | |
|---|---|---|
| CN | 108177540 A | 6/2018 |
| JP | H5-330391 A | 12/1993 |
| JP | 2017-117615 A | 6/2017 |

*Primary Examiner* — Phallaka Kik
(74) *Attorney, Agent, or Firm* — Sughrue Mion, PLLC

(57) ABSTRACT

An objective of the present invention is to miniaturize a connector for connecting an exchangeable battery to an electric vehicle. A power supply device includes a first battery which is exchangeable and includes a battery connector for connection to a moving object; a moving object connector disposed at the moving object and connectable to the battery connector; a first power converting section connected between the moving object connector and a load; a second battery connected to a power supply line in parallel to the first battery, wherein the power supply line is configured to connect the first power converting section to the load; and a control section which is configured to control the first power converting section in such a way that a current which is output from the first battery to the first power converting section via the moving object connector has a first value or a smaller value.

12 Claims, 9 Drawing Sheets

(56) References Cited

U.S. PATENT DOCUMENTS

| | | | |
|---|---|---|---|
| 2013/0069429 A1* | 3/2013 | Yang | H04Q 9/00 307/23 |
| 2015/0222117 A1* | 8/2015 | Im | H02J 1/06 307/52 |
| 2016/0134148 A1* | 5/2016 | Ide | H02J 7/0024 307/52 |
| 2016/0243961 A1 | 8/2016 | Schmitz | |
| 2017/0043670 A1 | 2/2017 | Zenner et al. | |
| 2017/0253138 A1 | 9/2017 | Ger | |
| 2019/0237980 A1* | 8/2019 | Yang | H02J 7/0047 |
| 2019/0312436 A1* | 10/2019 | Binder | H02J 7/00 |
| 2020/0185936 A1* | 6/2020 | Oishi | H02J 7/0024 |
| 2020/0195033 A1* | 6/2020 | Tajima | H02J 7/342 |
| 2020/0262301 A1* | 8/2020 | Sasahara | B60L 3/0046 |
| 2020/0339103 A1* | 10/2020 | Takahashi | B60L 3/04 |
| 2020/0376967 A1* | 12/2020 | Furukawa | B60L 50/40 |
| 2020/0412136 A1* | 12/2020 | Kristjansson | H02J 7/0063 |
| 2021/0119486 A1* | 4/2021 | Kanno | H02J 50/05 |
| 2022/0055468 A1* | 2/2022 | Maruyama | B60L 53/22 |

* cited by examiner

POWER SUPPLY DEVICE

BACKGROUND OF THE INVENTION

Technical Field

The present invention relates to a power supply device.

Background Art

In order to reduce carbon dioxide emission which is considered as a greenhouse gas, electric vehicles are increasingly distributed widely. Some electric vehicles which are distributed widely have an exchangeable battery installed therein (e.g. Patent Document 1). Such an exchangeable battery is charged outside the electric vehicle after the battery has been removed from the electric vehicle. When the battery installed in the electric vehicle has a little amount of charge, the battery is removed from the electric vehicle and exchanged with another battery which has been charged outside the electric vehicle.

CITATION LIST

Patent Literature

Patent Document 1: JP 2017-117615 A

SUMMARY OF THE INVENTION

When accelerating an electric vehicle, a high current between 200 A and 300 A flows through a motor of the electric vehicle at a peak. Therefore, a connector for connecting an exchangeable battery to the electric vehicle should be very large and robust in order to stand such a high current.

Therefore, an objective of the present invention is to miniaturize a connector for connecting an exchangeable battery to an electric vehicle.

In order to achieve the above-mentioned objective, a power supply device according to the present invention includes a first battery which is exchangeable and includes a battery connector for connection to a moving object; a moving object connector which is disposed at the moving object and connectable to the battery connector; a first power converting section connected between the moving object connector and a load; a second battery connected to a power supply line in parallel to the first battery, wherein the power supply line is configured to connect the first power converting section to the load; and a control section which is configured to control the first power converting section in such a way that a current which is output from the first battery to the first power converting section via the moving object connector has a first value or a smaller value.

The control section may be configured to control the first power converting section in such a way that a constant current is output from the first battery to the first power converting section via the moving object connector.

The control section may be configured to control the first power converting section in such a way that a current which is input to the first battery from the first power converting section via the moving object connector has a second value or a smaller value.

The power supply device may further include a charger at the power supply line, the charger being connected in parallel to the first battery, wherein the charger may include a connector for connection to an AC power supply; a second power converting section configured to convert an AC power into a DC power and to supply the DC power to the power supply line, the AC power having been supplied to the second power converting section from the AC power supply; and a relay configured to be switched between a connected state and a disconnected state, wherein the connector is connected to the power supply line in the connected state and disconnected from the power supply line in the disconnected state, and wherein the second battery may include an electrical storage section configured to store a power; and a relay configured to be switched between a connected state and a disconnected state, wherein the electrical storage section is connected to the power supply line in the connected state and disconnected from the power supply line in the disconnected state.

The present invention enables a connector to be miniaturized, the connector serving for connecting the exchangeable battery to the electric vehicle.

DETAILED DESCRIPTION OF THE PREFERRED EMBODIMENTS

<Power Supply Device 100>

Figure 1:
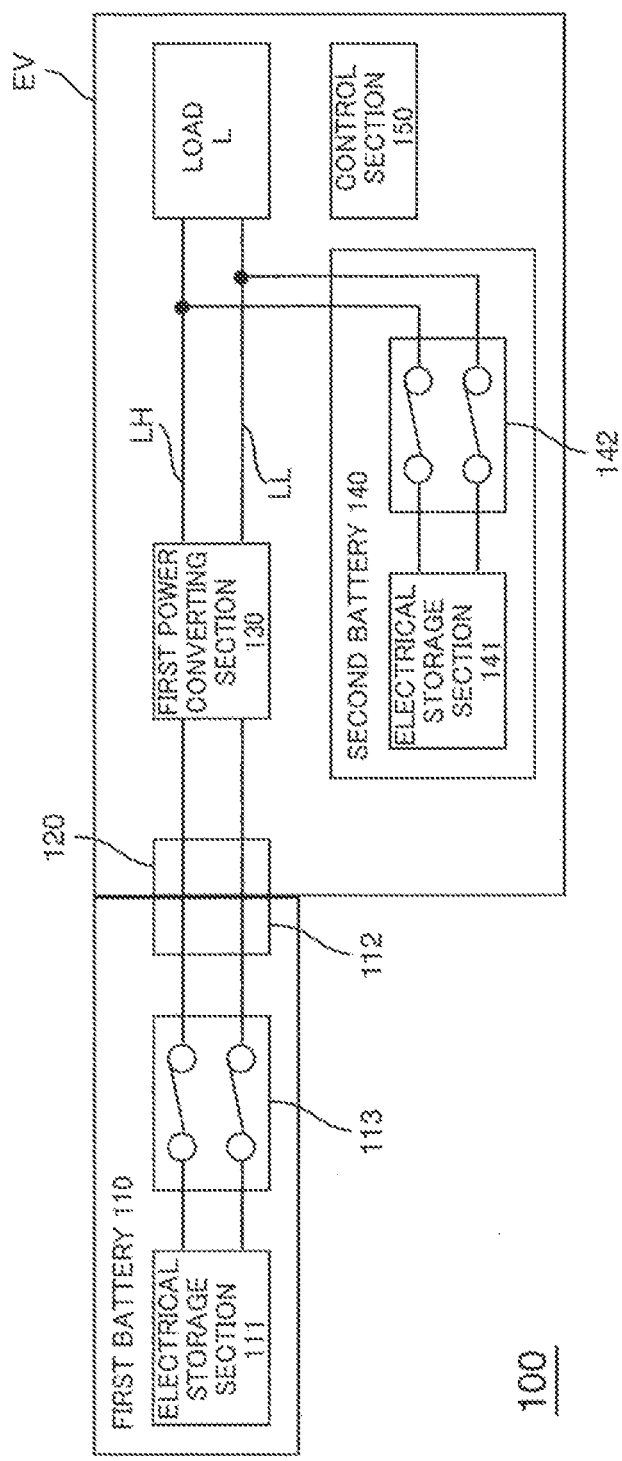
FIG. 1 shows a power supply device 100 according to an embodiment of the present invention.

FIG. 1 shows a power supply device 100 according to an embodiment of the present invention. The power supply device 100 includes a first battery 110, an electric vehicle connector (moving object connector) 120, a first power converting section 130, a second battery 140, and a control section 150. For example, the power supply device 100 supplies a power stored in the first battery 110 and/or second battery 140, to a load L of an electric vehicle (moving object) EV.

The first battery 110 includes an electrical storage section 111 for storing the power, a battery connector 112 for connection to the electric vehicle EV, and a relay 113 configured to be switched between a connected state and a disconnected state, wherein the electrical storage section 111 is connected to the battery connector 112 in the connected state, and disconnected from the battery connector 112 in the disconnected state. For example, the relay 113 is connected between the electrical storage section 111 and the battery connector 112, as shown in FIG. 1.

The electric vehicle connector 120 is connectable to the battery connector 112, and arranged in the electric vehicle EV. The first battery 110 is connected to the electric vehicle EV by connecting the battery connector 112 to the electric vehicle connector 120. The first battery 110 is an exchangeable battery for the electric vehicle EV, and configured to be charged outside the electric vehicle EV after the first battery 110 has been removed from the electric vehicle EV. For example, when the first battery 110 connected to the electric vehicle EV has a reduced amount of charge, this first battery 110 is removed from the electric vehicle EV and exchanged with another first battery 110 which has been charged outside the electric vehicle EV.

The first power converting section 130 is connected between the electric vehicle connector 120 and the load L. The first power converting section 130 may be e.g. an insulated DC/DC converter, such as an LLC converter or a Dual Active Bridge (DAV) converter.

The second battery 140 is connected to power supply lines LH and LL in parallel to the first battery 110, wherein the power supply lines LH and LL connect the first power converting section 130 to the load L. According to the present embodiment, this enables power supply to the load L from the second battery 140, in addition to power supply from the first battery 110.

The second battery 140 includes an electrical storage section 141 configured to store a power and a relay 142 configured to be switched between a connected state and a disconnected state, wherein the electrical storage section 141 is connected to the power supply lines LH and LL in the connected state and disconnected from the power supply lines LH and LL in the disconnected state. For example, the relay 142 is connected between the electrical storage section 141 and the power supply lines LH and LL, as shown in FIG. 1.

The second battery 140 is mounted to the electric vehicle EV, and configured to be charged with power supplied from the first battery 110.

The control section 150 controls power supply to the load L from the first battery 110 and/or the second battery 140 by controlling the first battery 110, the first power converting section 130 and the second battery 140.

The control section 150 is configured to control the first power converting section 130 in such a way that a current which is output from the first battery 110 to the first power converting section 130 via the electric vehicle connector 120 has a first value or a smaller value. Here, the first value is e.g. 50 A.

According to the present embodiment, this enables a value for a current to be limited which flows through the battery connector 112 and/or the electric vehicle connector 120. As a result, the present embodiment enables the battery connector 112 and/or the electric vehicle connector 120 to be miniaturized. Further, it is possible in the present embodiment to suppress firing incidents at a contact between the battery connector 112 and the electric vehicle connector 120.

Figure 2:
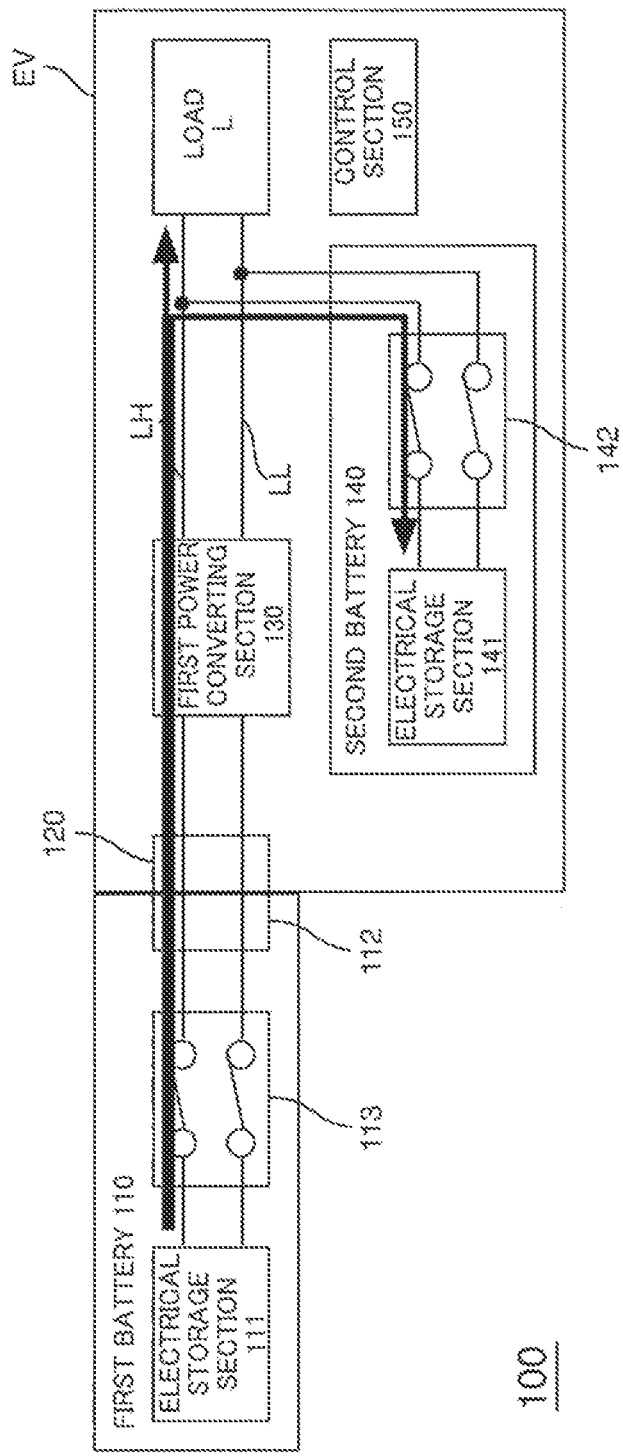
FIG. 2 illustrates a flow of power.

In this case, the control section 150 may control the first power converting section 130 in such a way that a constant current is output from the first battery 110 to the first power converting section 130 via the electric vehicle connector 120. In this manner, when the load L consumes a smaller current than a current output from the first battery 110, it is possible in the present embodiment to supply a power to the second battery 140 from the first battery 110 as well while supplying a power to the load L from the first battery 110, whereby the second battery 140 may be charged, as shown in FIG. 2.

Further, this results in that the second battery 140 continues to be charged when the load L consumes a small current. According to the present embodiment, the second battery 140 thus does not have a zero amount of charge, even when the first battery 110 has a zero amount of charge, which allows the electric vehicle EV to be driven with the second battery 140. According to the present embodiment, it is thus possible to present a request for battery exchange to a user of the electric vehicle EV after the first battery 110 exhibits a zero amount of charge.

The load L may include a load which consumes a larger current than the first value at a peak. As described above, the power supply device 100 according to the present embodiment includes the second battery 140, wherein a current above the first value can be transferred from the second battery to the load. Therefore, even when a load with a high consumed current exists, it is possible in the present embodiment to miniaturize the battery connector 112 and/or the electric vehicle connector 120.

Further, according to the present embodiment, the second battery 140 which outputs a high current above the first value is mounted to the electric vehicle EV. According to the present embodiment, this enables such a battery with a high output current to be prevented from being touched by a general user.

Furthermore, the first battery 110 according to the present embodiment is not a battery which outputs a high current. Therefore, the embodiment enables the first battery 110 to be produced with low costs as compared to a battery with a high output current.

Furthermore, the power supply device 100 according to the present embodiment includes two batteries, i.e. the first battery 110 and the second battery 140. According to the present embodiment, this allows the electric vehicle EV to continue to travel even when one of these batteries has a fault.

<Acceleration/Deceleration of the Electric Vehicle EV>

Figure 3:
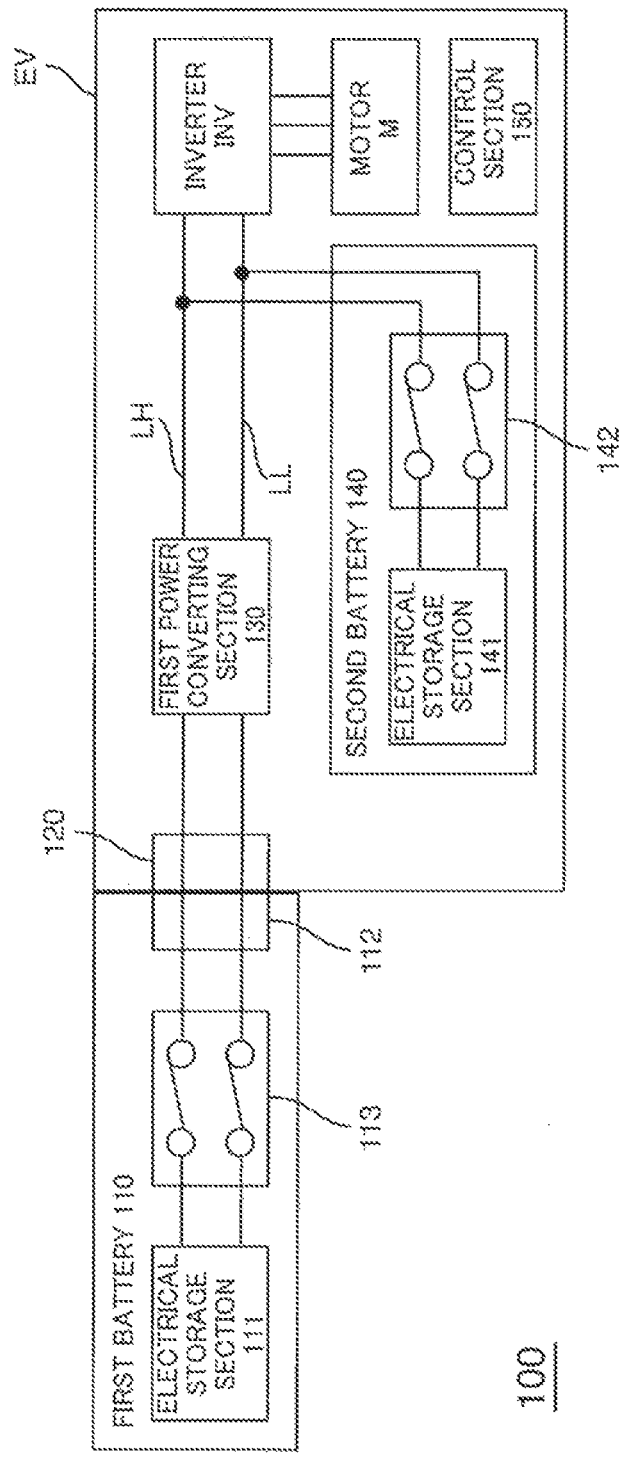
FIG. 3 shows a power supply device 100 according to an embodiment of the present invention.

For example, the load L includes a motor M which is connected to the power supply device 100 via an inverter INV and drives the electric vehicle EV, as shown in FIG. 3. When the electric vehicle EV travels at a constant speed, the motor M consumes a current of about 25 A. Accordingly, when the electric vehicle EV is travelling at a constant speed, the motor M can be driven with a power output from the first battery 110 e.g. by setting the first value to 50 A.

Figure 4:
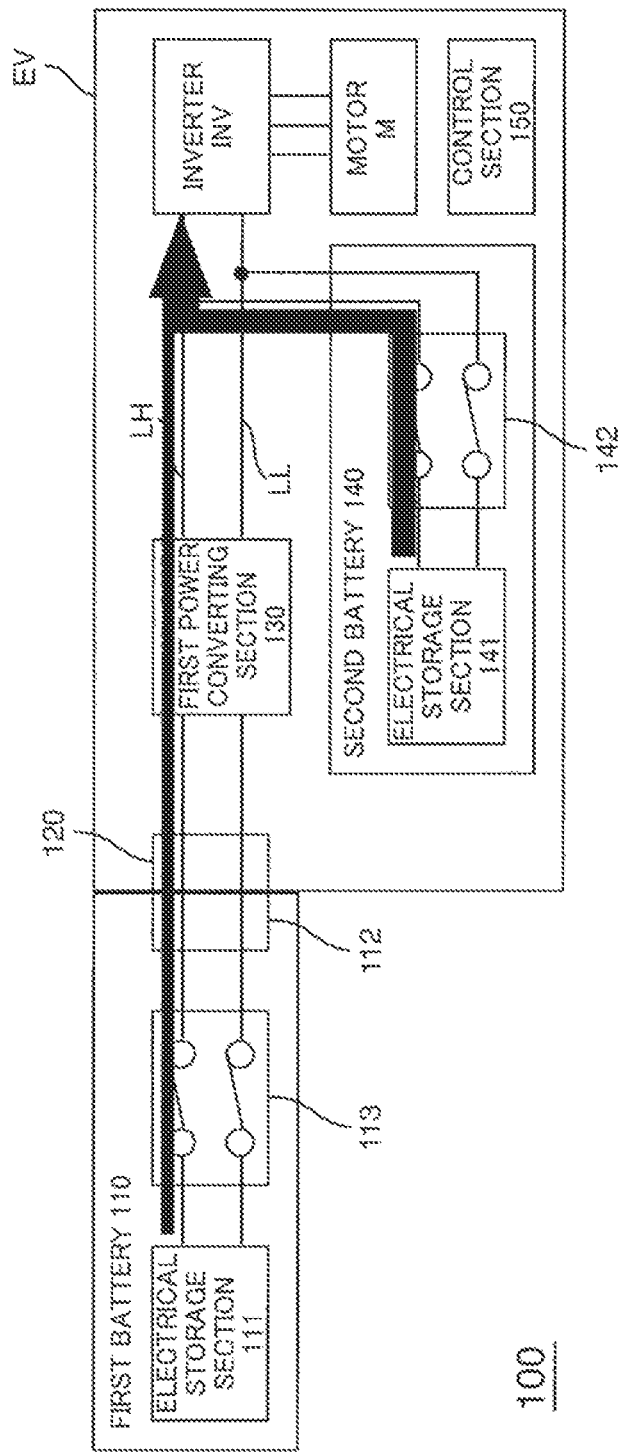
FIG. 4 illustrates a flow of power.

However, when accelerating the electric vehicle EV, the motor M consumes a current between 200 to 300 A at a peak. According to the present embodiment, in the case where the first value is smaller than 200 A (e.g. 50 A), the motor M is therefore supplied with power, in addition to the first battery 110, from the second battery 140 when accelerating the electric vehicle EV, as shown in FIG. 4.

Figure 5:
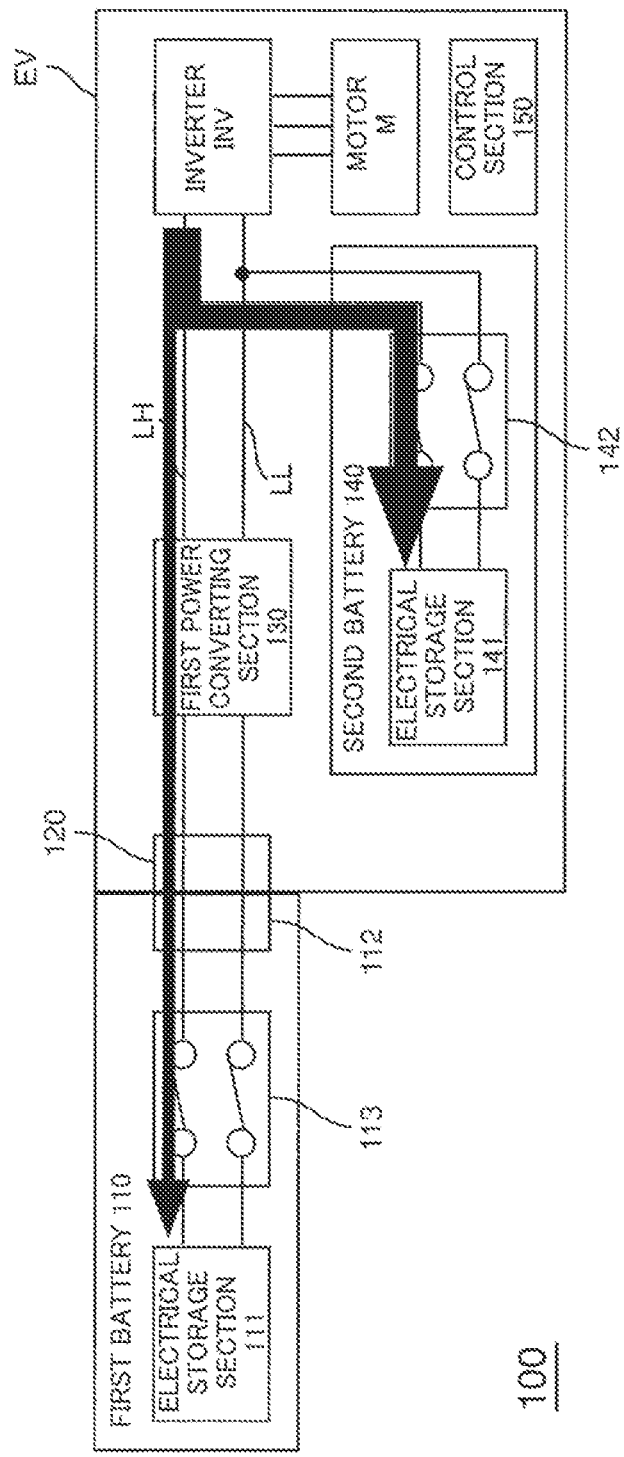
FIG. 5 illustrates a flow of power.

On the other hand, when decelerating the electric vehicle EV, the motor M generates an electric power. According to the present embodiment, when decelerating the electric vehicle EV (regeneration), the power generated by the motor M is therefore supplied to the first battery 110 and/or the second battery 140 to charge the first battery 110/second battery 140, as shown in FIG. 5. In this case, the control section 150 preferably controls the first power converting section 130 in such a way that a current which is input to the first battery 110 from the first power converting section 130 via the electric vehicle connector 120 has a second value or a smaller value.

This enables a value for a current to be suppressed which flows though the battery connector 112 and/or electric vehicle connector 120. As a result, it is possible to miniaturize the battery connector 112 and/or electric vehicle connector 120. The second value may be the same as or different from the first value.

Furthermore, according to the present embodiment, it is allowed to charge the first battery 110 even when the second battery 140 is fully charged, which can achieve efficient regeneration of a regenerative energy and thus an improved regeneration efficiency.

<Charger 200>

Figure 6:
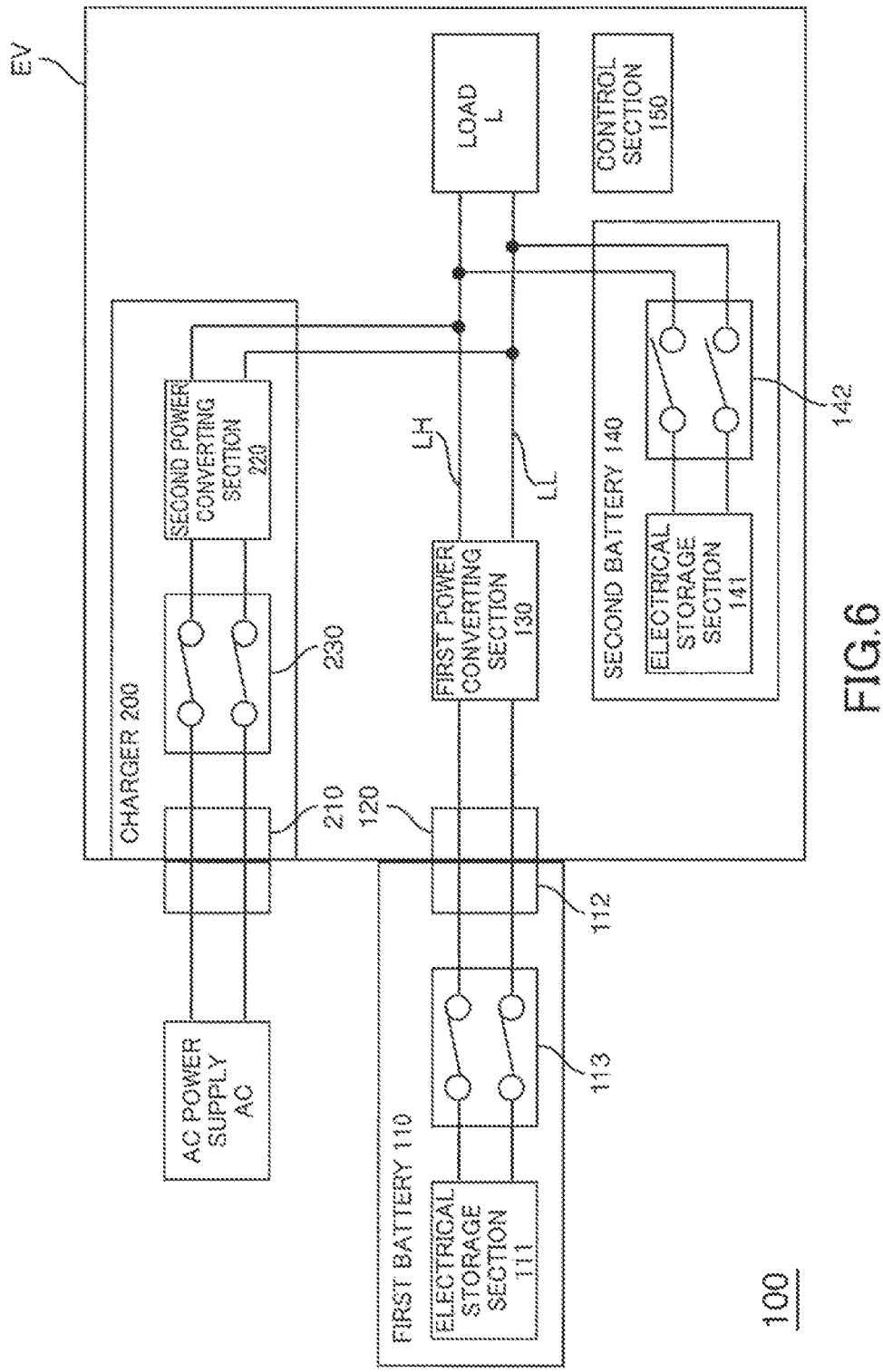
FIG. 6 shows a power supply device 100 according to an embodiment of the present invention.

FIG. 6 shows a power supply device 100 according to another embodiment of the present invention. In addition to a first battery 110, an electric vehicle connector 120, a first power converting section 130 and a second battery 140, the power supply device 100 according to the present embodiment further includes a charger 200 which is connected to power supply lines LH and LL in parallel to the first battery 110. According to the present embodiment, this enables the first battery 110 to be charged even when the first battery 110 is connected to the electric vehicle EV.

The charger 200 includes a connector 210 for connection to an AC power supply AC, a second power converting section 220 and a relay 230.

The second power converting section 220 is connected between the connector 210 and the power supply lines LH and LL, and converts an AC power into a DC power and outputs the DC power to the power supply lines LH and LL, the AC power having been received from the AC power supply AC which is connected to the connector 210. The second power converting section 220 may include a power factor correction circuit which corrects a power factor of the AC power output from the AC power supply AC.

The relay 230 is switched between a connected state and a disconnected state, wherein the connector 210 is connected to the power supply lines LH and LL in the connected state and disconnected from the power supply lines LH and LL in the disconnected state. The relay 230 may be connected between the connector 210 and the second power converting section 220, or between the second power converting section 220 and the power supply lines LH and LL, as shown in FIG. 6.

Figure 7:
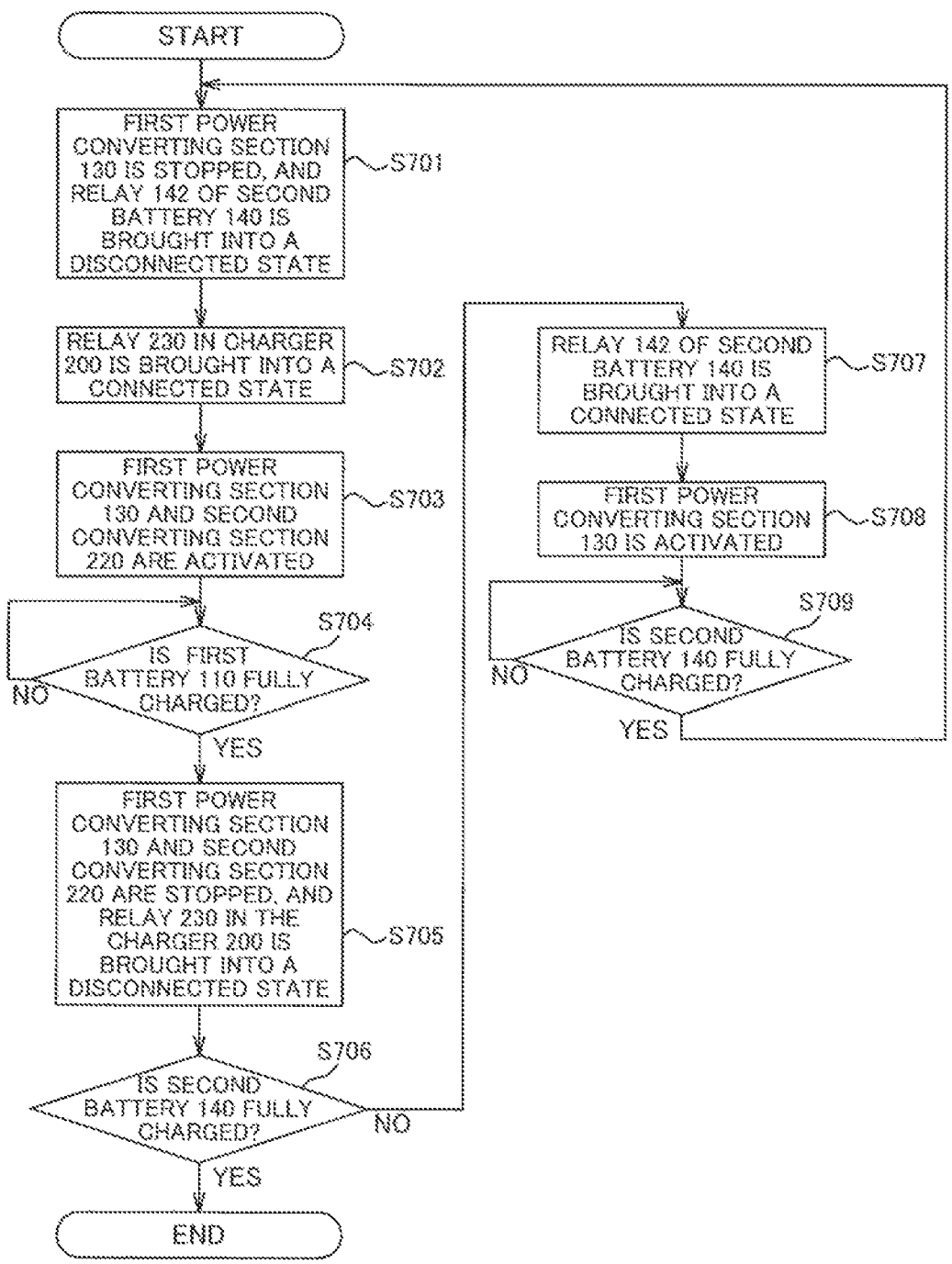
FIG. 7 shows an exemplary charging process for a first battery 110 and a second battery 140.

FIG. 7 shows an exemplary charging process for a first battery 110 and a second battery 140. Before starting this charging process, the second power converting section 220 in the charger 200 is not activated, and the relay 230 in the charger 200 is in the disconnected state.

Figure 8:
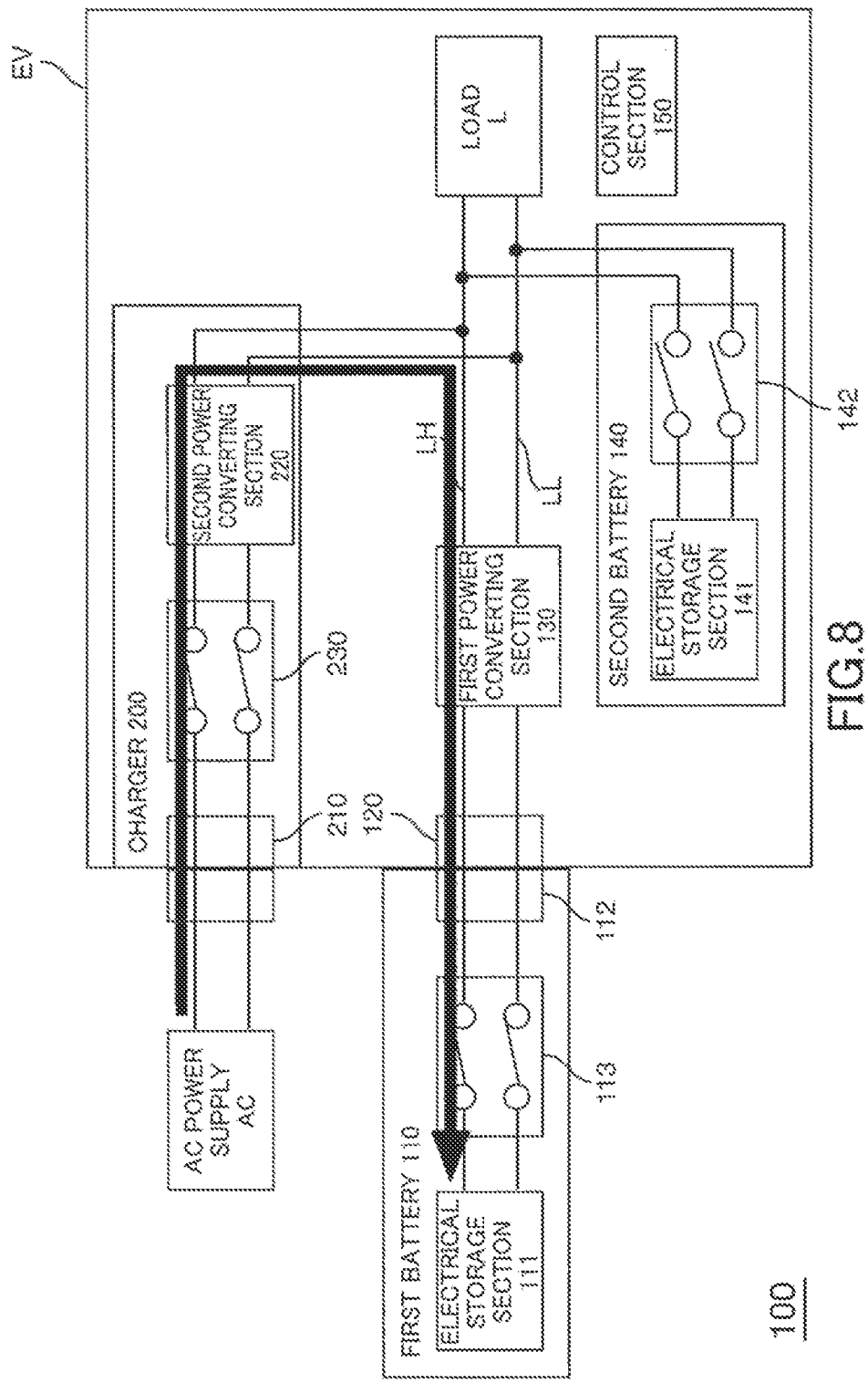
FIG. 8 illustrates a flow of power.

Once the charging process has started to operate, the control section 150 stops the first power converting section 130, and switches the relay 142 of the second battery 140 to the disconnected state while keeping the relay 113 of the first battery 110 in the connected state (step S701). Then, the control section 150 switches the relay 230 in the charger 200 to the connected state (step S702), and activates the first power converting section 130 and the second power converting section 220 (step S703). At this time, the control section 150 controls the first power converting section 130 to supply a DC power output from the second power converting section 220 to the first battery 110. In this manner, the first battery 110 is charged with a power supplied from the AC power supply AC, as shown in FIG. 8.

When the first battery 110 has been fully charged (step S704, YES), the control section 150 stops the first power converting section 130 and the second power converting section 220, switches the relay 230 in the charger 200 to the disconnected state (step S705), and checks whether the second battery 140 is fully charged (step S706).

If the second battery 140 is fully charged (step S706, YES), the charging process with the AC power supply AC is ended.

Figure 9:
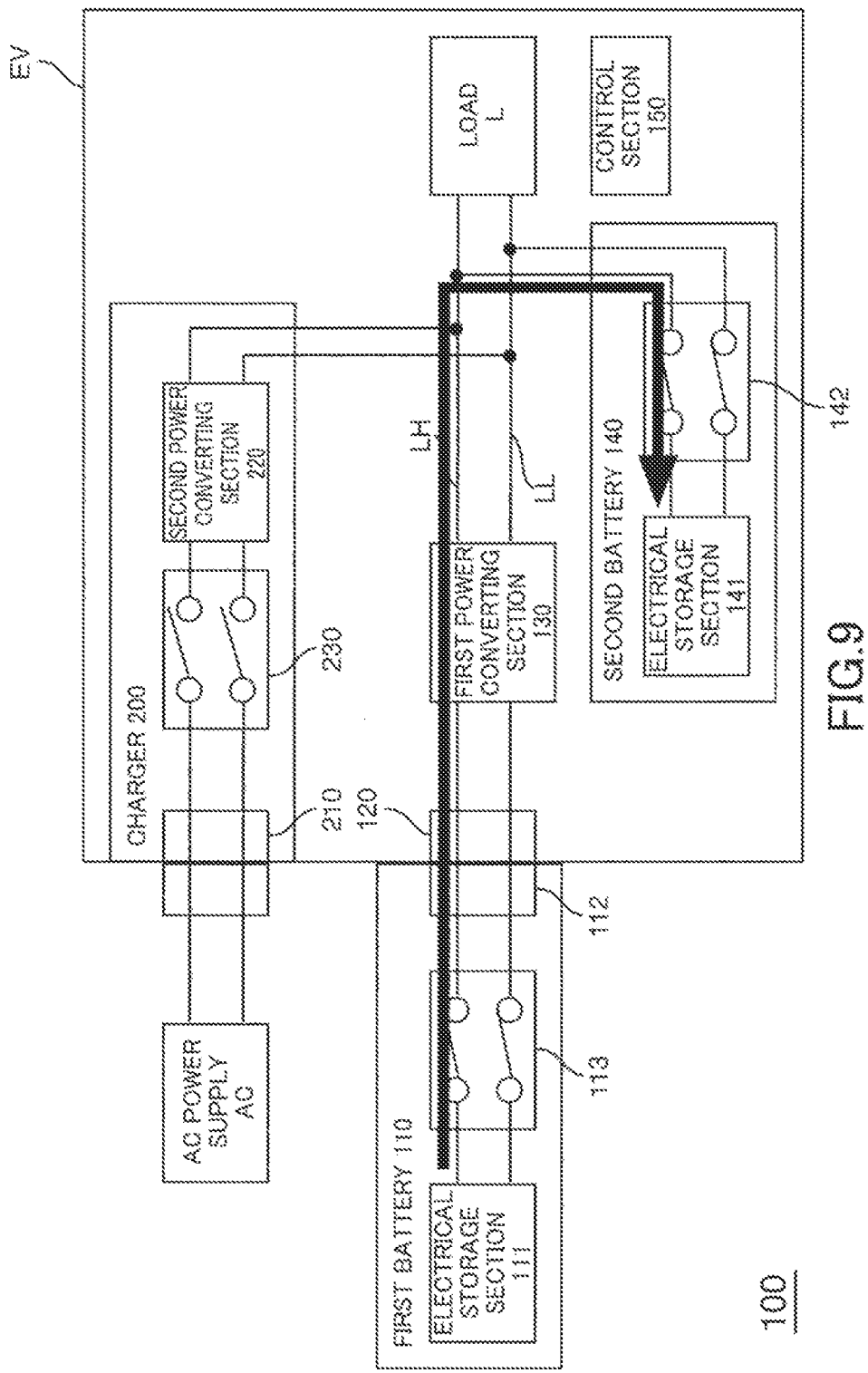
FIG. 9 illustrates a flow of power.

If the second battery 140 is not fully charged (step S706, NO), the relay 142 of the second battery 140 is switched to the connected state while keeping the relay 113 of the first battery 110 in the connected state (step S708), and the first power converting section 130 is activated (step S709). At this time, the control section 150 controls the first power converting section 130 to supply a power output from to the first battery 110 to the second battery 140. In this manner, the second battery 140 is charged with the power output from the first battery 110, as shown in FIG. 9. Then, if the second battery 140 has been fully charged (step S709, YES), it returns to step S701.

In this manner, the charging process as described above is provided so that the first battery 110 is charged by the AC power supply AC via the charger 200, while the second battery 140 is charged by the first battery without passing through the charger 200. Accordingly, the present embodiment does not require that both of the relay 142 of the second battery 140 and the relay 230 in the charger 200 are simultaneously in the connected state, which allows the connector 210 of the charger 200 to always remain insulated from the second battery 140.

As long as the first power converting section is an insulated power converter, the present embodiment thus enables the connector 210 of the charger 200 to always remain insulated from the first battery 110/second battery 140, even when the second power converting section 220 is not an insulated power converter. Therefore, the present embodiment enables the second power converting section 220 to be miniaturized as compared to an insulated power converting section with a transformer and/or multiple switching elements. As a result, it is possible to miniaturize the charger 200.

It is to be noted that in the case where the load L includes a motor M connected to the power supply device 100 via an inverter INV (FIG. 3), an AC power may be converted into a DC power by means of the inverter INV and/or motor M (for example, DE 102016213061 A1 and JP 2007-318970 A describe techniques for converting a power with an inverter and/or a motor). This enables the second power converting section 220 to be configured with the inverter INV and/or the motor M, and eliminates the need for an additional circuit for converting an AC power into a DC power, which allows the charger 200 to be further miniaturized.

The present invention has been described by means of preferable embodiments thereof above. Although the present invention has been described here by demonstrating specific examples, these may be modified and altered in various ways without departing from the core and scope of the present invention defined in the claims.

REFERENCE SIGNS LIST

100 Power supply device
110 First battery
111 Electrical storage section
112 Battery connector
113 Relay
120 Electric vehicle connector
130 First power converting section
140 Second battery
141 Electrical storage section
142 Relay
150 Control section
200 Charger
210 Connector
220 Second power converting section
230 Relay

What is claimed is:
1. A power supply device comprising:
a first battery which is exchangeable and includes a battery connector for connection to a moveable object;

a moving object connector which is disposed at the moveable object and connectable to the battery connector;

a first power converting section connected between the moving object connector and a load;

a second battery connected to a power supply line in parallel to the first battery, wherein the power supply line is configured to connect the first power converting section to the load; and a control section which is configured to control the first power converting section in such a way that a current, which is output from the first battery to the first power converting section via the moving object connector, has a value less than or equal to a first value.

2. The power supply device according to claim 1,
wherein the control section is configured to control the first power converting section in such a way that a constant current is output from the first battery to the first power converting section via the moving object connector.

3. The power supply device according to claim 2,
wherein the control section is configured to control the first power converting section in such a way that a current, which is input to the first battery from the first power converting section via the moving object connector, has a value less than or equal to second value.

4. The power supply device according to claim 3, further comprising a charger at the power supply line, the charger being connected in parallel to the first battery,
wherein the charger includes:
a connector for connection to an AC power supply;
a second power converting section configured to convert an AC power into a DC power and to supply the DC power to the power supply line, the AC power having been supplied to the second power converting section from the AC power supply; and
a relay configured to be switched between a connected state and a disconnected state, wherein the connector is connected to the power supply line in the connected state and disconnected from the power supply line in the disconnected state, and
wherein the second battery includes:
an electrical storage section configured to store a power; and
a relay configured to be switched between a connected state and a disconnected state, wherein the electrical storage section is connected to the power supply line in the connected state and disconnected from the power supply line in the disconnected state.

5. The power supply device according to claim 2, further comprising a charger at the power supply line, the charger being connected in parallel to the first battery,
wherein the charger includes:
a connector for connection to an AC power supply;
a second power converting section configured to convert an AC power into a DC power and to supply the DC power to the power supply line, the AC power having been supplied to the second power converting section from the AC power supply; and
a relay configured to be switched between a connected state and a disconnected state, wherein the connector is connected to the power supply line in the connected state and disconnected from the power supply line in the disconnected state, and
wherein the second battery includes:
an electrical storage section configured to store a power; and
a relay configured to be switched between a connected state and a disconnected state, wherein the electrical storage section is connected to the power supply line in the connected state and disconnected from the power supply line in the disconnected state.

6. The power supply device according to claim 1,
wherein the control section is configured to control the first power converting section in such a way that a current, which is input to the first battery from the first power converting section via the moving object connector, has a value less than or equal to a second value.

7. The power supply device according to claim 6, further comprising a charger at the power supply line, the charger being connected in parallel to the first battery,
wherein the charger includes:
a connector for connection to an AC power supply;
a second power converting section configured to convert an AC power into a DC power and to supply the DC power to the power supply line, the AC power having been supplied to the second power converting section from the AC power supply; and
a relay configured to be switched between a connected state and a disconnected state, wherein the connector is connected to the power supply line in the connected state and disconnected from the power supply line in the disconnected state, and
wherein the second battery includes:
an electrical storage section configured to store a power; and
a relay configured to be switched between a connected state and a disconnected state, wherein the electrical storage section is connected to the power supply line in the connected state and disconnected from the power supply line in the disconnected state.

8. The power supply device according to claim 1, further comprising a charger at the power supply line, the charger being connected in parallel to the first battery,
wherein the charger includes:
a connector for connection to an AC power supply;
a second power converting section configured to convert an AC power into a DC power and to supply the DC power to the power supply line, the AC power having been supplied to the second power converting section from the AC power supply; and
a relay configured to be switched between a connected state and a disconnected state, wherein the connector is connected to the power supply line in the connected state and disconnected from the power supply line in the disconnected state, and
wherein the second battery includes:
an electrical storage section configured to store a power; and
a relay configured to be switched between a connected state and a disconnected state, wherein the electrical storage section is connected to the power supply line in the connected state and disconnected from the power supply line in the disconnected state.

9. The power supply device according to claim 1,
wherein the second battery is configured to output a current greater than the first value.

10. The power supply device according to claim 9,
wherein the load is configured to consume the current greater than the first value at a peak.

11. The power supply device according to claim 1,
wherein while the moveable object is moving, the control section is configured to control the first power converting section to output the current from the first battery to the first power converting section via the moving object connector at a value less than or equal to the first value.

12. The power supply device according to claim 1, wherein the control section is further configured to control the first power converting section to output the current from the first battery to the first power converting section via the moving object connector constantly and supply the current from the first battery to the first power converting section via the moving object connector to both the load and the second battery at the same time.

* * * * *